(12) United States Patent
Agiwal et al.

(10) Patent No.: US 10,200,846 B2
(45) Date of Patent: Feb. 5, 2019

(54) METHOD AND APPARATUS FOR TRANSMITTING AND RECEIVING MESSAGE IN WIRELESS COMMUNICATION SYSTEM

(71) Applicant: Samsung Electronics Co., Ltd., Suwon-si, Gyeonggi-do (KR)

(72) Inventors: Anil Agiwal, Suwon-si (KR); Hyun-Jeong Kang, Seoul (KR); Young-Bin Chang, Anyang-si (KR); June Hwang, Incheon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 111 days.

(21) Appl. No.: 15/325,002

(22) PCT Filed: Mar. 23, 2016

(86) PCT No.: PCT/KR2016/002915
§ 371 (c)(1),
(2) Date: Jan. 9, 2017

(87) PCT Pub. No.: WO2016/153264
PCT Pub. Date: Sep. 29, 2016

(65) Prior Publication Data
US 2017/0215059 A1    Jul. 27, 2017

(30) Foreign Application Priority Data

Mar. 24, 2015  (IN) .............................. 318/KOL/2015

(51) Int. Cl.
*H04W 8/00* (2009.01)
*H04W 76/14* (2018.01)
(Continued)

(52) U.S. Cl.
CPC ............. *H04W 8/005* (2013.01); *H04L 29/08* (2013.01); *H04L 67/1002* (2013.01);
(Continued)

(58) Field of Classification Search
CPC .... H04W 8/005; H04W 76/045; H04W 76/25
See application file for complete search history.

(56) References Cited

U.S. PATENT DOCUMENTS

2014/0056220 A1  2/2014 Poitau et al.
2014/0341121 A1  11/2014 Chang et al.
(Continued)

OTHER PUBLICATIONS

"Introduction of ProSe", R2-150734, 3GPP TSG-RAN2 Meeting #89, Feb. 9-13, 2015, Athens, Greece.
(Continued)

*Primary Examiner* — Redentor Pasia
(74) *Attorney, Agent, or Firm* — Jefferson IP Law, LLP

(57) ABSTRACT

The present invention relates not only to a 4th-generation (4G) communication system such as long term evolution (LTE) but also to a 5th-generation (5G) or pre-5G communication system to be provided to support a higher data transmission rate. According to the present invention, a first user equipment (UE) is configured to transmit, to a base station, a request message comprising information indicating that a discovery message is to be transmitted through a data channel and information on the amount of data related to the discovery message, receive, from the base station, a control message comprising information on a resource allocated to transmit the discovery message and information indicating that the control message comprises information for the transmission of the discovery message, and transmits the discovery message to a second UE through the data channel based on the control message.

20 Claims, 17 Drawing Sheets

(51) Int. Cl.
*H04L 29/08* (2006.01)
*H04W 76/25* (2018.01)
*H04W 72/04* (2009.01)
*H04W 48/12* (2009.01)

(52) U.S. Cl.
CPC ....... *H04W 72/0406* (2013.01); *H04W 76/14* (2018.02); *H04W 76/25* (2018.02); *H04W 48/12* (2013.01)

(56) References Cited

U.S. PATENT DOCUMENTS

| | | | |
|---|---|---|---|
| 2014/0348081 A1 | 11/2014 | Liao | |
| 2015/0009858 A1* | 1/2015 | Jung | H04W 48/12 370/254 |
| 2015/0271720 A1* | 9/2015 | Yamada | H04W 76/14 370/331 |
| 2015/0271841 A1* | 9/2015 | Yamada | H04W 56/0045 370/329 |
| 2015/0326484 A1* | 11/2015 | Cao | H04W 4/70 370/329 |
| 2015/0327312 A1* | 11/2015 | Burbidge | H04W 72/14 370/329 |
| 2016/0044707 A1* | 2/2016 | Folke | H04W 76/14 370/329 |
| 2016/0128082 A1* | 5/2016 | Chen | H04W 72/10 370/329 |
| 2016/0192427 A1* | 6/2016 | Yun | H04L 12/189 370/329 |
| 2016/0374110 A1* | 12/2016 | Lee | H04W 4/023 |
| 2017/0280486 A1* | 9/2017 | Lee | H04W 76/002 |
| 2017/0325255 A1* | 11/2017 | Xu | H04W 72/1252 |
| 2018/0167966 A1* | 6/2018 | Dinan | H04L 5/0053 |

OTHER PUBLICATIONS

'Introduction of ProSe', R2-150348, 3GPP TSG-RAN WG2 Meeting #89, Feb. 10-14, 2015, Athens, Greece.

* cited by examiner

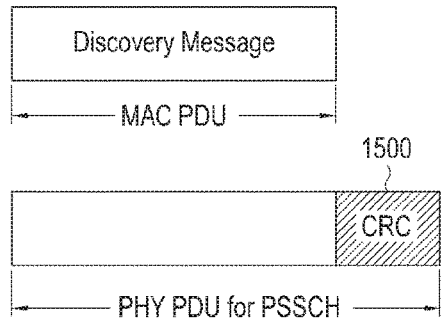 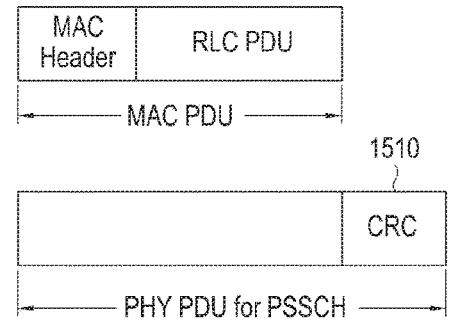
FIG.15A  FIG.15B
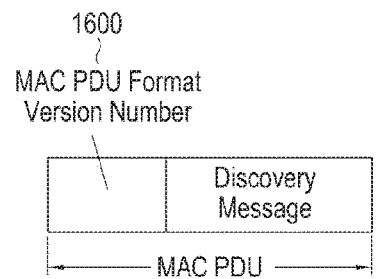 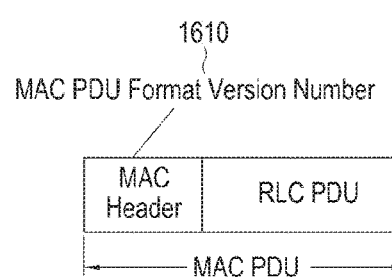
FIG.16A  FIG.16B

METHOD AND APPARATUS FOR TRANSMITTING AND RECEIVING MESSAGE IN WIRELESS COMMUNICATION SYSTEM

CROSS-REFERENCE TO RELATED APPLICATION(S)

This application is a U.S. National Stage application under 35 U.S.C. § 371 of an International application filed on Mar. 23, 2016 and assigned application number PCT/KR2016/002915, which claimed the benefit of an Indian patent application filed on Mar. 24, 2015 in the Indian Patent Office and assigned Serial number 318/KOL/2015, the entire disclosure of which is hereby incorporated by reference.

TECHNICAL FIELD

The present disclosure relates to methods and apparatuses of transmitting and receiving messages in wireless communication systems.

BACKGROUND

In order to meet the demand for wireless data traffic soaring since the fourth-generation (4G) communication system came to the market, there are ongoing efforts to develop enhanced fifth-generation (5G) communication systems or pre-5G communication systems. For the reasons, the 5G communication system or pre-5G communication system is called the beyond 4G network communication system or post long-term evolution (LTE) system.

For higher data transmit rates, 5G communication systems are considered to be implemented on ultra high frequency bands (mmWave), such as, e.g., a 60 GHz band. To mitigate path loss on the ultra-high frequency band and increase the reach of radio waves, the following techniques are taken into account for the 5G communication system: beamforming, massive multi-input multi-output (MIMO), full dimensional MIMO (FD-MIMO), array antenna, analog beamforming, and large scale antenna.

Also being developed are various technologies for the 5G communication system to have an enhanced network, such as evolved or advanced small cell, cloud radio access network (cloud RAN), ultra-dense network, device-to-device (D2D) communication, wireless backhaul, moving network, cooperative communication, coordinated multi-point (CoMP), and interference cancellation.

Other techniques being developed for 5G system are among hybrid frequency shift keying (FSK) and quadrature amplitude modulation (QAM) (FQAM) and sliding window superposition coding (SWSC), as advanced coding modulation (ACM) schemes, and filter bank multi-carrier (FBMC), non-orthogonal multiple access (NOMA), and sparse code multiple access (SCMA), as advanced access techniques.

D2D discovery is the technology in which a user equipment (UE) capable of D2D communication (hereinafter, denoted a "D2D-capable UE") determines whether other D2D-capable UEs are in proximity. Discovering a D2D-capable UE is to determine whether there are another UEs capable of D2D communication using a D2D discovery method. in cases where proximity needs to be known by one or more verified applications of a D2D-capable UE performing a discovery operation in the D2D-capable UE, the D2D-capable UE performing the discovery operation becomes of interest.

For example, a social networking application may be activated to use a D2D discovery function. D2D discovery is performed by activating the D2D-capable UE of the user of a predetermined social networking application, and discovery may be done by the D2D-capable UEs of the friends of the user. As another example, may activate the D2D-capable UE of the user of a predetermined discovery application in order to search for nearby shops/restaurants. A D2D-capable UE may search for nearby other D2D-capable UEs using direct UE-to-UE signaling.

Meanwhile, discovery messages used for a D2D discovery operation are generally transmitted through a physical sidelink discovery channel (PSDCH). However, the PSDCH is subject to the limitation that it can transmit only discovery messages with a fixed size. Further, the PSDCH is unavailable for new messages for inter-vehicle communication or messages for public safety requiring periodic transmission in variable sizes.

Therefore, a need exists for a scheme capable of effective transmission regardless of the size of messages to be transmitted. Also required is a scheme allowing a UE to send discovery messages distinctively from normal data so that the discovery messages may be easily detected on the receive side.

The above information is presented as background information only to assist with an understanding of the present disclosure. No determinations have been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and apparatus for transmitting and receiving a message in a wireless communication system.

Another aspect of the present disclosure is to provide a method and apparatus for transmitting and receiving a message that is transmitted in a different channel from a data channel used for device-to-device (D2D) communication in a wireless communication system.

Another aspect of the present disclosure is to provide a method and apparatus for transmitting and receiving data and messages, with the data and messages distinguished from each other, according to an embodiment of the present disclosure.

Another aspect of the present disclosure is to provide a method and apparatus for allocating a resource used to transmit a message through a data channel used for D2D communication in a wireless communication system.

In accordance with an aspect of the present disclosure, a method for transmitting a message by a user equipment (UE) in a wireless communication system is provided. The method comprises the operations of transmitting, to a base station, a request message comprising information indicating that a discovery message is to be transmitted through a data channel and information about a data amount related to the discovery message, receiving, from the base station, a control message comprising information about a resource allocated to transmit the discovery message and information indicating that the control message comprises information for transmitting the discovery message, and transmitting the discovery message to a second UE through the data channel based on the control message.

In accordance with another aspect of the present disclosure, a method for allocating a resource for transmitting a message by a base station in a wireless communication system is provided. The method comprises receiving, from a first UE, a request message comprising information indicating that a discovery message is to be transmitted through a data channel and information about a data amount related to the discovery message, allocating a resource to transmit the discovery message to the first UE based on a resource pool related to the data channel, and transmitting, to the first UE, a control message comprising information about the allocated resource and information indicating that the control message comprises information for transmitting the discovery message.

In accordance with another aspect of the present disclosure, a user equipment (UE) in a wireless communication system is provided. The UE comprises a transmitter configured to transmit, to a base station, a request message comprising information indicating that a discovery message is to be transmitted through a data channel and information about a data amount related to the discovery message, a receiver configured to receive, from the base station, a control message including information about a resource allocated to transmit the discovery message and information indicating that the control message comprises information for transmitting the discovery message, and a processor configured to control the transmitter to transmit the discovery message to a second UE through the data channel based on the control message.

In accordance with another aspect of the present disclosure, a base station in a wireless communication system is provided. The base station comprises a receiver configured to receive, from a first UE, a request message including information indicating that a discovery message is to be transmitted through a data channel and information about a data amount related to the discovery message, a processor configured to allocate a resource to transmit the discovery message to the first UE based on a resource pool related to the data channel, and a transmitter configured to transmit, under a control of the at least one processor, to the first UE, a control message comprising information about the allocated resource and information indicating that the control message comprises information for transmitting the discovery message.

According to an embodiment of the present disclosure, it is possible to transmit and receive a message that is transmitted in a different channel from a data channel used for D2D communication in a wireless communication system.

Further, according to an embodiment of the present disclosure, messages may periodically be transmitted regardless of the size limitation through a data channel in a wireless communication system.

Further, according to an embodiment of the present disclosure, a message and data are distinctively transmitted on the same channel in a wireless communication system, allowing a receiver to distinctively process the data and the message.

Further, according to an embodiment of the present disclosure, a resource used to transmit a message through a data channel used for D2D communication in a wireless communication system may efficiently be allocated.

Other aspects, advantages, and salient features of the present disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 15A and 15B are views illustrating a discovery protocol data unit (PDU) and a data PDU according to an embodiment of the present disclosure;

FIGS. 16A and 16B are views illustrating a discovery PDU and a data PDU according to an embodiment of the present disclosure;

Throughout the drawings, it should be noted that like reference numbers are used to depict the same or similar elements, features, or structures.

DETAILED DESCRIPTION

Figure 1:
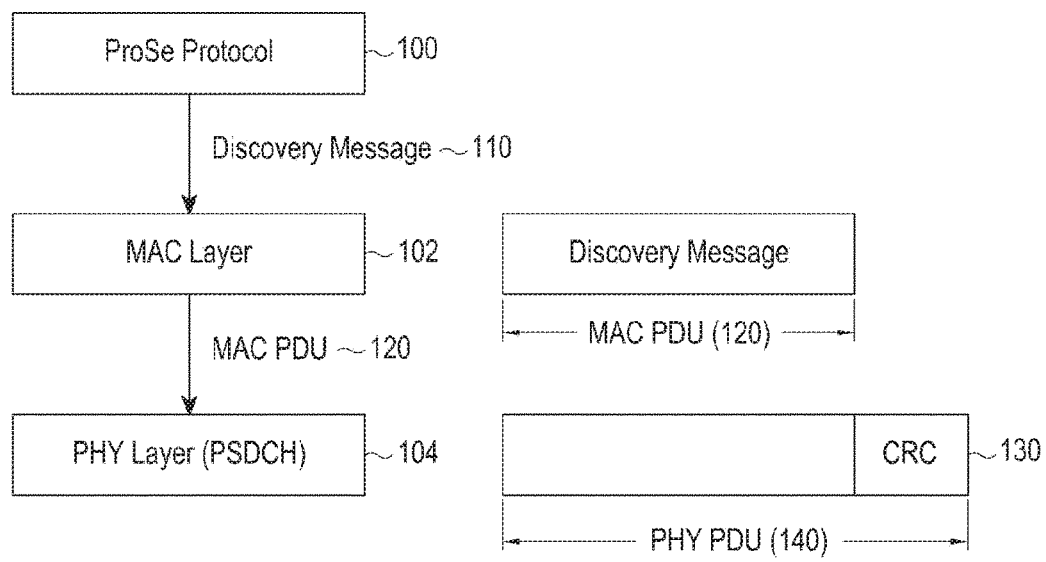
FIG. 1 is a view illustrating a protocol stack used to transmit a discovery message in a wireless communication system according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purposes only and not for the purpose of limiting the present disclosure defined by the appended claims and equivalents.

It is to be understood that the singular forms "a," "an," and "the" include plural referents unless the context clearly indicates otherwise. Thus, for example, reference to "a component surface" includes reference to one or more of such surfaces.

The terms coming with ordinal numbers such as 'first' and 'second' may be used to denote various components, but the components are not limited by the terms. The terms are used only to distinguish one component from another. For example, a first component may be denoted a second component, and vice versa without departing from the scope of the present disclosure. The term "and/or" may denote a combination(s) of a plurality of related items as listed or any of the items.

It will be further understood that the terms "comprise" and/or "have," when used in this specification, specify the presence of stated features, integers, operations, elements, and/or components, but do not preclude the presence or addition of one or more other features, integers, operations, elements, components, and/or groups thereof.

Unless otherwise defined, all terms including technical and scientific terms used herein have the same meaning as commonly understood by one of ordinary skill in the art to which the embodiments of the present disclosure belong. Such terms as those generally defined in the dictionary should be appreciated to be consistent with contextual meanings of relevant technology.

According to an embodiment of the present disclosure, an electronic device as disclosed herein may include a communication function. For example, the electronic device may be a smartphone, a tablet personal computer (PC), a PC, a mobile phone, a video phone, an e-book reader, a desktop PC, a laptop PC, a netbook PC, a personal digital assistant (PDA), a portable multimedia player (PMP), a Moving Picture Experts Group phase 1 or phase 2 (MPEG-1 or MPEG-2) audio layer 3 (MP3) player, a mobile medical device, a camera, a wearable device (e.g., a head-mounted device (HMD)), electronic clothes, an electronic bracelet, an electronic necklace, an electronic appcessory, an electronic tattoo, or a smart watch.

According to various embodiments of the disclosure, the electronic device may be a smart home appliance with a communication function. For example, the smart home appliance may be a television (TV), a digital video disc (DVD) player, an audio player, a refrigerator, an air conditioner, a vacuum cleaner, an oven, a microwave oven, a washer, a drier, an air cleaner, a set-top box, a TV box (e.g., Samsung HomeSync™, Apple TV™, or Google TV™), a gaming console, an electronic dictionary, a camcorder, or an electronic picture frame.

According to various embodiments of the disclosure, the electronic device may be a medical device (e.g., magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, an sailing electronic device (e.g., a sailing navigation device, a gyroscope, or a compass), an aviation electronic device, a security device, or a robot for home or industry.

According to various embodiments of the present disclosure, the electronic device may be a piece of furniture with a communication function, part of a building/structure, an electronic board, an electronic signature receiving device, a projector, or various measurement devices (e.g., devices for measuring water, electricity, gas, or electromagnetic waves).

According to various embodiments of the present disclosure, an electronic device may be a combination of the above-listed devices. It should be appreciated by one of ordinary skill in the art that the electronic device is not limited to the above-described devices.

According to an embodiment of the present disclosure, the transmitter or receiver may be, e.g., a mobile terminal. Here, mobile terminal may interchangeably be used with other terms, such as user equipment (UE), device, or subscriber station.

Further, according to an embodiment of the present disclosure, the transmitter or receiver may be, e.g., a base station. Here, base station may interchangeably be used with other terms, such as node B, evolved node B (eNB), evolved universal terrestrial radio access network (E-UTRAN) node B (E-UTRAN nodeB, eNB), or access point (AP).

According to an embodiment of the present disclosure, there are proposed a method and apparatus for transmitting and receiving a message in a wireless communication system. In particular, according to an embodiment of the present disclosure, there are proposed a method and apparatus for transmitting and receiving a message that is transmitted on a discovery channel using a data channel in a wireless communication system. The message may be one of a discovery message used for a device-to-device (D2D) discovery operation, a vehicle-to-vehicle (V2V) message used for vehicle-to-vehicle communication (hereinafter, denoted "V2V" communication), and a periodic message (packet/data).

Meanwhile, apparatuses and methods as proposed as proposed according to embodiments of the present disclosure may be applicable to various communication systems, such as long-term evolution (LTE) mobile communication systems, LTE-advanced (LTE-A) mobile communication systems, licensed-assisted access (LAA)-LTE mobile communication system, high speed downlink packet access (HSDPA) mobile communication systems, high speed uplink packet access (HSUPA) mobile communication systems, 3rd generation project partnership 2 (3GPP2) high rate packet data (HRPD) mobile communication systems, 3GPP2 wideband code division multiple access (WCDMA) mobile communication systems, 3GPP2 code division multiple access (CDMA) mobile communication systems, Institute of electrical and electronics engineers (IEEE) 802.16m communication systems, IEEE 802.16e communication system, evolved packet systems (EPSs), mobile internet protocol (Mobile IP) systems, digital multimedia broadcast (DMB) services, portable digital video broadcasting-handheld (DVB-H) and advanced television systems committee-mobile/handheld (ATSC-M/H) services or other mobile broadcast services, internet protocol television (IPTV) services or other digital video broadcast systems, and moving picture experts group (MPEG) media transport (MMT) systems or other various communication systems.

D2D technology may be used based on a discovery operation for discovering other nearby devices and a communication operation for transmitting and receiving data through direct D2D communication. In the discovery operation, the UE may transmit a discovery message to discover another UE positioned adjacent to the UE. An example of a protocol stack used to transmit the discovery message is shown in FIG. 1.

FIG. 1 is a view illustrating a protocol stack used to transmit a discovery message in a wireless communication system according to an embodiment of the present disclosure.

Referring to FIG. 1, the protocol stack includes a proximity services (hereinafter, "ProSe") protocol unit 100, a medium access control (MAC) layer 102, and a physical (PHY) layer 104.

In the ProSe protocol unit 100, a discovery message 110 for discovering a device for D2D communication is generated and transmitted to the media access control (MAC) layer 102.

In the MAC layer 102, a MAC header is added to the discovery message 110, or no particular process is performed on the discovery message 110. In the MAC layer 102, a MAC protocol data unit (PDU) 120 is generated based on the discovery message 110, and the MAC PDU 120 is transmitted to the PHY layer 104.

In the PHY layer 104, a cyclic redundancy check (CRC) code 130 is added to the MAC PDU 120, generating a PHY PDU 140. In the PHY layer 104, the PHY PDU 140 is transmitted through a physical sidelink discovery channel (PSDCH).

The PSDCH is subject to the limitation that it can transmit only discovery messages with a fixed size. The PSDCH is also subject to the limitation that a resource only for transmission may be allocated during a scheduling control period. Hence, the PSDCH is unavailable for new messages for inter-vehicle communication or messages for public safety requiring periodic or aperiodic transmission in variable sizes.

A method that may be considered to overcome this issue is to transmit a discovery message, V2V message, or periodic messages using a data channel, e.g., a physical sidelink shared channel (PSSCH).

Figure 2:
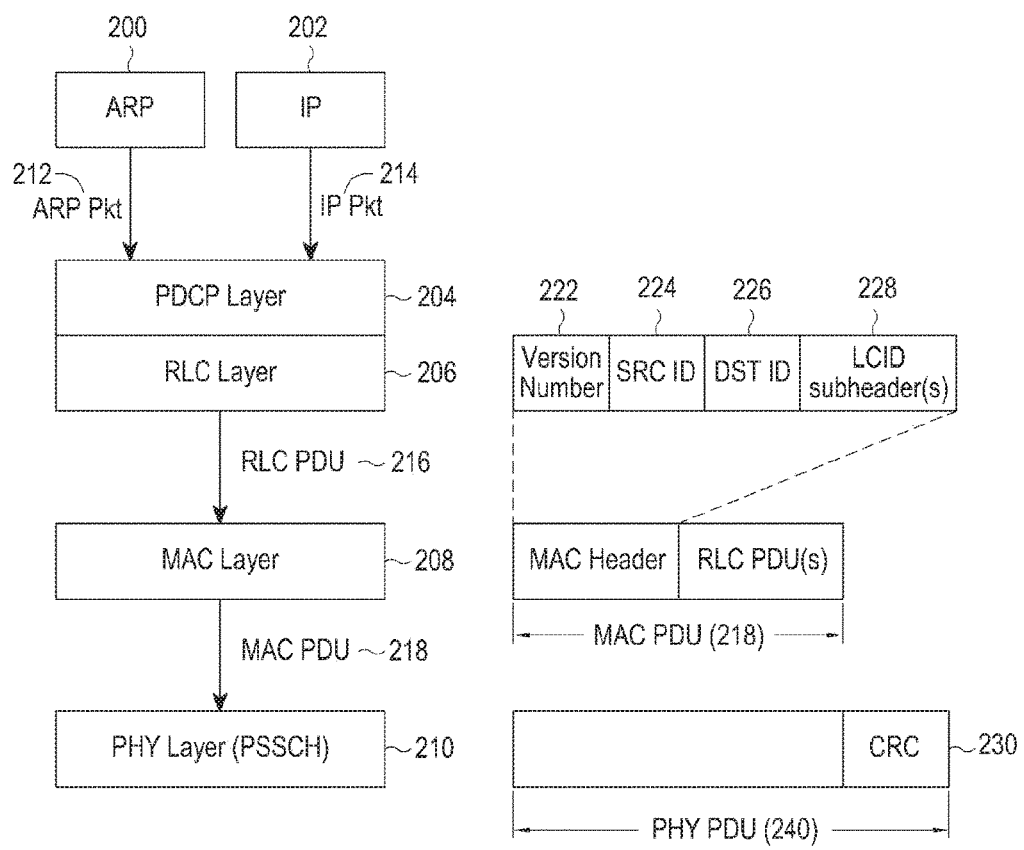
FIG. 2 is a view illustrating a protocol stack used to perform data transmission through a physical sidelink shared channel (PSSCH) in a wireless communication system according to an embodiment of the present disclosure.

FIG. 2 is a view illustrating a protocol stack used to perform data transmission through a PSSCH in a wireless communication system according to an embodiment of the present disclosure.

Referring to FIG. 2, the protocol stack used to perform the distress signal includes an address resolution protocol (ARP) unit 200, an internet protocol (IP) unit 202, a packet data convergence protocol (PDCP) layer 204, a radio link control (RLC) layer 206, a MAC layer 208, and a PHY layer 210.

In the ARP unit 200, an ARP packet 212 containing physical network address information is transmitted to the PDCP layer 204. In the IP unit 202, an IP packet (214) related to data to be transmitted is transmitted to the PDCP layer 204.

In the RLC layer 206, a RLC PDU 216 is generated based on the IP packet 214 received from the PDCP layer 204, and the RLC PDU 216 is transmitted to the MAC layer 208. In the MAC layer 208, a MAC header 220 is added to the RLC PDU 216. Here, the MAC header 220 includes a version number field 222, a source identifier (SRC ID) field 224, a destination ID (DST ID) field 226, and a logical channel ID (LCID) subheader field 228.

In the MAC layer 208, a MAC PDU 218 is generated based on the RLC PDU 216, and the MAC PDU 218 is transmitted to the PHY layer 210. In the PHY layer 210, a CRC code 230 is added to the MAC PDU 218, generating a PHY PDU 240. The generated PHY PDU 240 is transmitted through a PSSCH.

Meanwhile, the UE may obtain resource information corresponding to the PSSCH using the following method in order to transmit data through the PSSCH. If the network includes resource information corresponding to the PSSCH in a system broadcast message and sends the same, the UE may obtain the resource information based on the system broadcast message. In another way, the UE may obtain the resource information corresponding to the PSSCH using a method as shown in FIG. 3.

Figure 3:
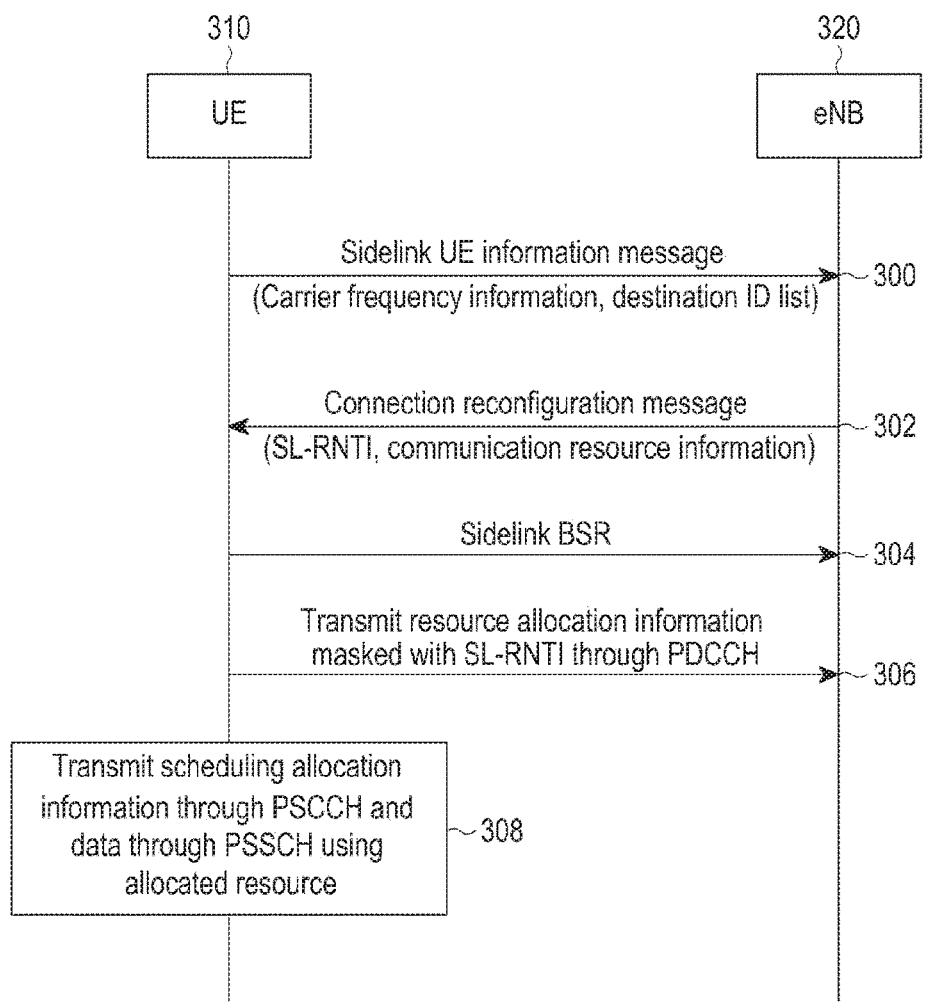
FIG. 3 is a signal flowchart illustrating a process in which a user equipment (UE) is allocated resource information corresponding to the PSSCH in a wireless communication system according to an embodiment of the present disclosure.

FIG. 3 is a signal flowchart illustrating a process in which a UE is allocated resource information corresponding to the PSSCH in a wireless communication system according to an embodiment of the present disclosure.

Referring to FIG. 3, the UE 310, in the case of performing D2D transmission, sends a sidelink UE information message to an eNB 320 in operation 300. The sidelink UE information message is a message for informing the eNB 320 that the UE 310 needs D2D transmission, and may include, e.g., a "CommTxResourceReq" information element (IE) containing a destination ID list including IDs of target devices for performing D2D transmission and carrier frequency information used by the UE 310 for D2D transmission.

The eNB 320, upon receiving the sidelink UE information message, transmits a connection reconfiguration message to the UE 310 in operation 302. The connection reconfiguration message may include a "CommTxConfig" information IE containing information about a physical sidelink common control channel (PSCCH) and a sidelink radio network temporary identifier (SL-RNTI).

The UE 310 transmits a sidelink buffer status report (BSR) to the eNB 320 in operation 304. The sidelink BSR may include, e.g., information indicating the amount of data to be transmitted by the UE 310 for D2D communication.

The eNB 320 allocates a resource for D2D communication from a PSSCH resource pool based on the sidelink BSR. In operation 306, the eNB 320 masks information about the allocated resource with the SL-RNTI and transmits the same to the UE 310 through a physical downlink control channel (PDCCH).

Upon receiving the information about the allocated resource, the UE 310 performs D2D communication using the allocated resource. In other words, the UE 310, in operation 308, transmits scheduling assignment information to a target UE to perform D2D communication through the PSCCH and sends data to the target UE through the PSSCH.

Meanwhile, there is required a method enabling data and sidelink discovery message (or V2V message or periodic message) both to be transmitted through the PSSCH. To that end, according to an embodiment of the present disclosure, there are proposed a method for allocating a PSSCH resource for transmitting the discovery message (or V2V message or periodic message), a method allowing the target UE, as a receiving UE, to differentiate whether the PDU received through the PSSCH includes the data or discovery message (or V2V message or periodic message), and a method allowing the transmitting UE to differentiate whether the resource allocated for transmission is one for transmitting the discovery message (or V2V message or periodic message) or transmitting data.

Hereinafter, although what is related to transmission of the discovery message is described as an example for ease of description, the same may also apply where a V2V message or periodic message is used instead of the discovery message, according to an embodiment of the present disclosure. Further, the scheduling control period and/or discovery period set forth below may be used as the transmission period during which a V2V message or periodic message is transmitted.

According to an embodiment of the present disclosure, allocating a resource to transmit a discovery message may largely come into three ways. Hereinafter, an embodiment as per each method is specifically described.

Figure 4:
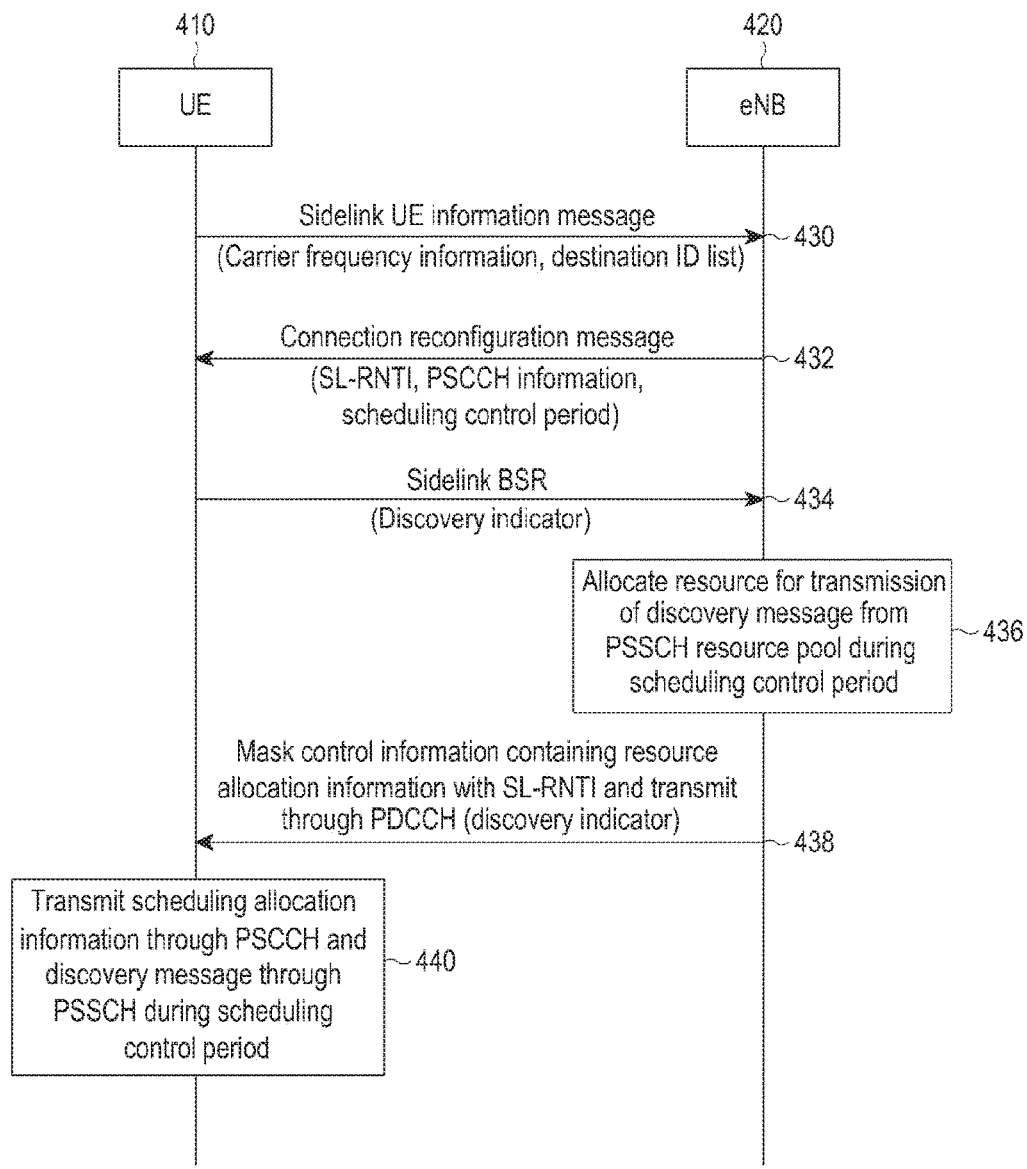
FIG. 4 is a signal flowchart illustrating a process of allocating a resource used to transmit a discovery message through a PSSCH in a wireless communication system according to an embodiment of the present disclosure.

FIG. 4 is a signal flowchart illustrating a process of allocating a resource used to transmit a discovery message through a PSSCH in a wireless communication system according to an embodiment of the present disclosure.

Referring to FIG. 4, the UE 410, in the case of transmitting a discovery message for D2D communication, sends a sidelink UE information message to the eNB 420 in operation 430. The sidelink UE information message is a message for informing the eNB 420 that the UE 410 needs D2D transmission through the PSSCH, and may include, e.g., a "CommTxResourceReq" information IE containing a destination ID list including IDs of target devices related to D2D transmission and carrier frequency information for use by the UE 410 for D2D transmission.

The eNB 420, upon receiving the sidelink UE information message, transmits a connection reconfiguration message to the UE 410 in operation 432. The connection reconfiguration message may be, e.g., a radio resource control (RRC) connection reconfiguration message and may include a "CommTxConfig" information IE containing information about a scheduling control period and resource information related to the PSCCH, and SL-RNTI.

In operation 434, the UE 410 sends a sidelink BSR to the eNB 420 to be allocated a dedicated resource (hereinafter, denoted a "discovery resource") for use in transmission of a discovery message. The sidelink BSR may include, e.g., information indicating the amount of data related to the discovery message. The sidelink BSR may also include information (e.g., a discovery indicator) for indicating that the sidelink BSR requires a discovery resource or information for indicating that a discovery resource is periodically required.

The eNB 420 allocates a discovery resource to the UE 410 based on the sidelink BSR in operation 436. The discovery resource allocated to the UE 410 may be determined from a PSSCH resource pool. The eNB 420 may perform the operation of operation 436 at each scheduling control period, and the UE 410 may use the allocated discovery resource until before the scheduling control period expires.

Meanwhile, the scheduling control period may be included in, e.g., a system broadcast information message rather than the connection reconfiguration message, and may be used in other various ways; e.g., information about multiple, not one, scheduling control periods may be used.

The eNB 420 transmits control information containing the information about the allocated discovery resource and the SL-RNTI to the UE 410 through the PDCCH in operation 438. Here, the control information may contain information (e.g., a discovery indicator) indicating that the allocated discovery resource is to be used for transmission of a discovery message.

The UE 410, upon receiving the control information, sends a discovery message based on the allocated discovery resource. That is, in operation 440, the UE 410 sends scheduling allocation information to the target UE through the PSCCH during the scheduling control period and sends the discovery message to the target UE through the PSSCH. The transmission of the discovery message may be carried out based on, e.g., time and frequency information as per the scheduling allocation information.

Figure 5A:
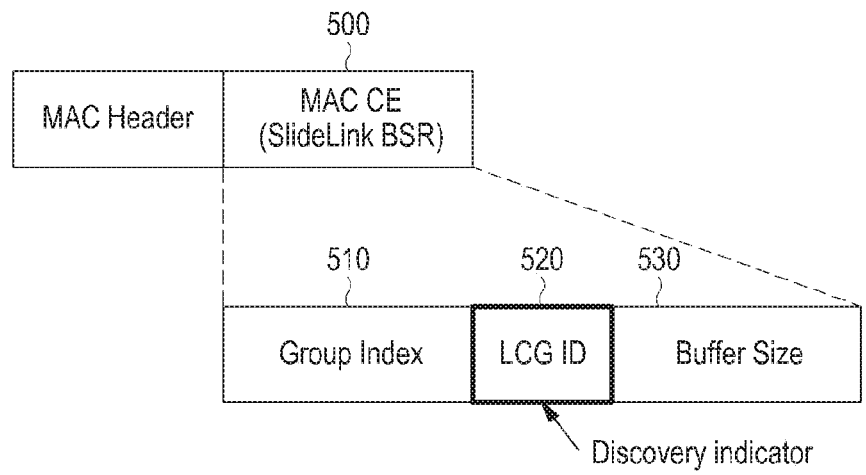
FIG. 5A is a view illustrating a sidelink buffer status report (BSR) according to an embodiment of the present disclosure.

Meanwhile, in operation 434, the information required to indicate that the discovery resource is required which is transmitted to the eNB 420 may be included in, e.g., the sidelink BSR, as shown in FIG. 5A.

FIG. 5A is a view illustrating a sidelink BSR according to an embodiment of the present disclosure.

Referring to FIG. 5A, the sidelink BSR 500 is included in a MAC payload, and contains a group index field 510, a logical channel group ID (LCG ID) field 520, and a buffer size field 530.

The group index field 510 contains an index value indicating a ProSe destination. The LCG ID field 520 contains information for identifying the group of the logical channel for which a buffer status has been reported. The buffer size field 530 contains information indicating the total amount of data available to all logical channels of the ProSe destination.

At least one of the group index field 510 and the LCG ID field 520 may contain information for indicating that the sidelink BSR is one for transmission of the discovery message, as information for indicating that the discovery resource is required. The information for indicating that it is one for transmission of the discovery message through the PSSCH may contain, e.g., a discovery indicator or a preset value.

Figure 5B:
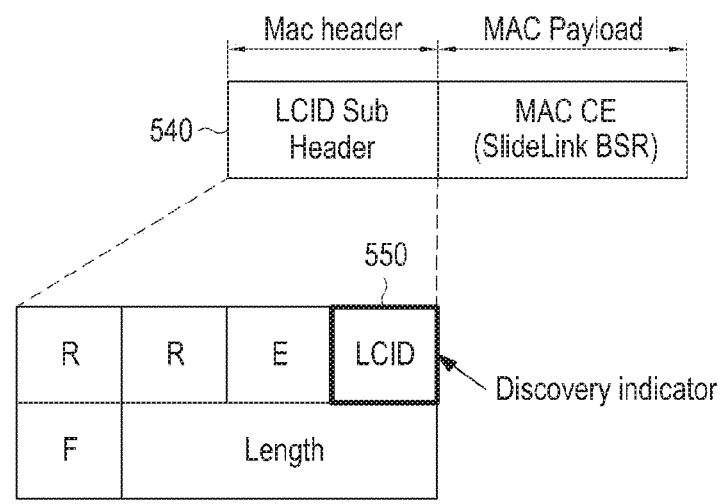
FIG. 5B is a view illustrating a logical channel identifier (LCID) subheader corresponding to a sidelink BSR according to an embodiment of the present disclosure.

Meanwhile, the information for indicating that the sidelink BSR needs the discovery resource may be included in the LCID subheader 540 corresponding to the sidelink BSR as shown in FIG. 5B.

FIG. 5B is a view illustrating a LCID subheader corresponding to a sidelink BSR according to an embodiment of the present disclosure.

Referring to FIG. 5B, the R field in the LCID subheader contained in the MAC header denotes a reserved field, and the E field, as an extension field, denotes whether a next field has a F or length field. The F field, as a format field, denotes whether the length field has seven or 15 bits, and the length field denotes the length of the MAC service data unit (SDU) or MAC control element (CE) corresponding to the MAC subheader.

Last, the LCID field 550, as a logical channel identifier field, identifies a logical channel or denotes whether a MAC CE is present. The LCG ID field 550 may contain information for indicating that the sidelink BSR is one for transmission of the discovery message, as information for indicating that the discovery resource is required. The information for indicating that it is one for transmission of the discovery message through the PSSCH may contain, e.g., a discovery indicator or a preset value.

Figure 6:
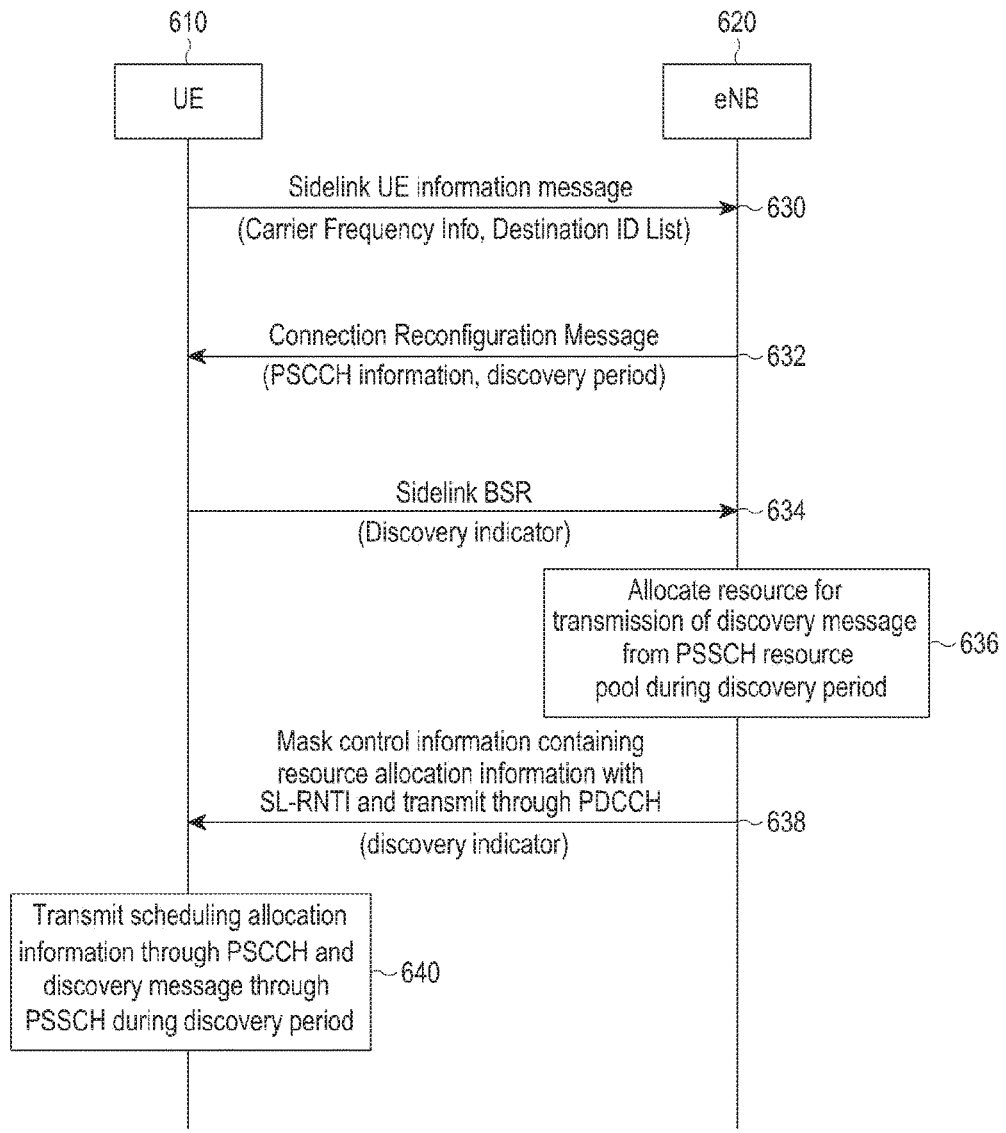
FIG. 6 is a signal flowchart illustrating a process of allocating a resource used to transmit a discovery message through a PSSCH in a wireless communication system according to an embodiment of the present disclosure.

FIG. 6 is a signal flowchart illustrating a process of allocating a resource used to transmit a discovery message through a PSSCH in a wireless communication system according to an embodiment of the present disclosure.

The process shown in FIG. 6 is the same as the process of FIG. 4 except for the following. In operation 632 of FIG. 6, the connection reconfiguration message transmitted from the eNB 620 to the UE 610 contains information about a discovery period along with the SL-RNTI and PSCCH information. Here, the discovery period may be set to be larger than the scheduling control period used in FIG. 4 (e.g., as a multiple of the scheduling control period).

Accordingly, the eNB 620, in operation 636, allocates a discovery resource from the PSSCH resource pool to the UE 610 at each discovery period larger than the scheduling control period of FIG. 4. The UE 610 sends a discovery message at each discovery period. That is, in operation 640, the UE 610 sends scheduling allocation information to the target UE through the PSCCH during the discovery period and sends the discovery message to the target UE through the PSSCH. The transmission of the discovery message may be carried out based on, e.g., time and frequency information as per the scheduling allocation information.

In order to transmit a discovery message through the PSSCH, meanwhile, the sidelink BSR may contain additional indicators. For example, the sidelink BSR may contain information about the type of discovery. The type of discovery may include discovery of a group member or relay discovery. The duration (or period) for discovery per type may previously be defined. The eNB may determine discovery duration per type and send information about the determined discovery duration in a system information broadcast message or connection reconfiguration message to the UE. In addition, operations 630, 634 and 638 correspond, in operation, to operations 430, 434 and 438, respectively. Since operations 430, 434 and 438 have been described above with respect to FIG. 4, a description of operations 630, 634 and 638 is omitted herein.

Figure 7:
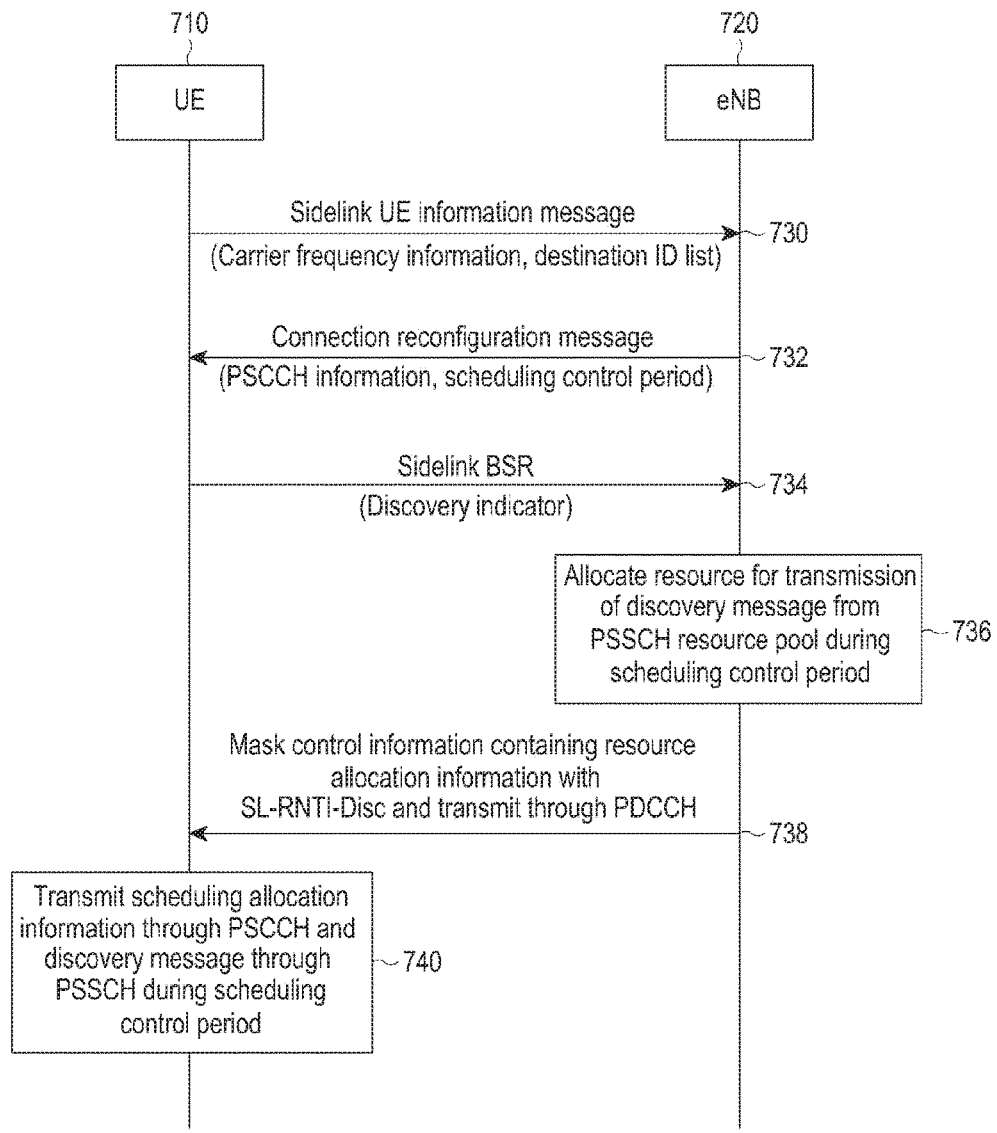
FIG. 7 is a signal flowchart illustrating a process of allocating a resource used to transmit a discovery message through a PSSCH in a wireless communication system according to an embodiment of the present disclosure.

FIG. 7 is a signal flowchart illustrating a process of allocating a resource used to transmit a discovery message through a PSSCH in a wireless communication system according to an embodiment of the present disclosure.

The process shown in FIG. 7 is the same as the process of FIG. 4 except for the following. In FIG. 7, the eNB 720, upon receiving the sidelink UE information message from the UE 710, transmits a connection reconfiguration message to the UE 710 in operation 732. The connection reconfiguration message may contain a "CommTxConfig" information IE containing information about a scheduling control period, resource information related to the PSCCH, SL-RNTI-Disc, and SL-RNTI.

Here, the SL-RNTI-Disc is one for indicating control information related to transmission of a discovery message and may be used for mask the information on the PDCCH. That is, the eNB 720, in operation 738, masks the control information containing the information about the discovery resource with the SL-RNTI-Disc and sends the same through the PDCCH to the UE 710. In this case, the control information need not include the discovery indicator. In addition, operations 730, 734, 736 and 740 correspond, in operation, to operations 430, 434, 436 and 440, respectively. Since operations 430, 434, 436 and 440 have been described above with respect to FIG. 4, a description of operations 730, 734, 736 and 740 is omitted herein.

Figure 8:
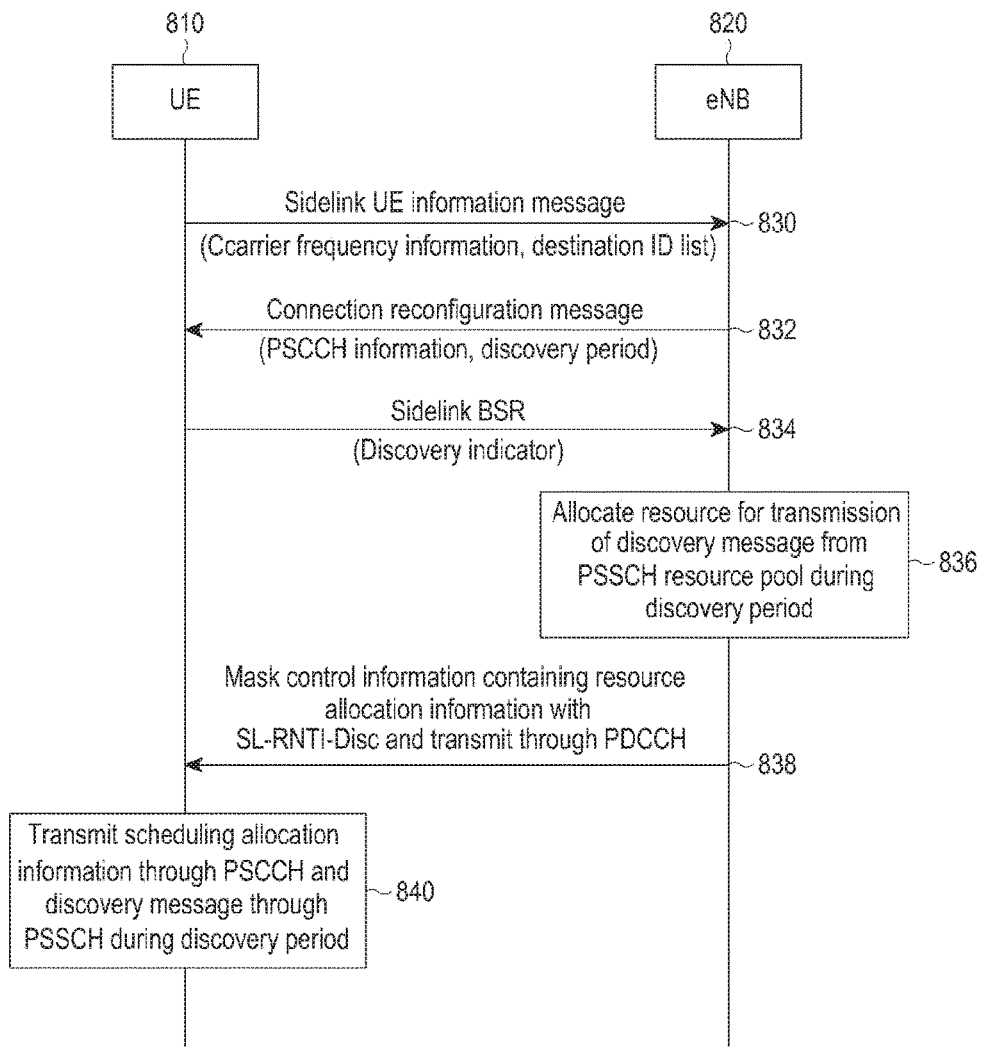
FIG. 8 is a signal flowchart illustrating a process of allocating a resource used to transmit a discovery message through a PSSCH in a wireless communication system according to an embodiment of the present disclosure.

FIG. 8 is a signal flowchart illustrating a process of allocating a resource used to transmit a discovery message through a PSSCH in a wireless communication system according to an embodiment of the present disclosure.

The process shown in FIG. 8 is the same as the process of FIG. 7 except for the following. In operation 832 of FIG. 8, the connection reconfiguration message transmitted from the eNB 820 to the UE 810 contains information about a discovery period along with the SL-RNTI, SL-RNTI-Disc, and PSCCH information. Here, the discovery period may be set to be larger than the scheduling control period used in FIG. 7 (e.g., as a multiple of the scheduling control period).

Accordingly, the eNB 820, in operation 836, allocates a discovery resource from the PSSCH resource pool to the UE 810 at each discovery period larger than the scheduling control period of FIG. 7. The UE 810 sends a discovery message at each discovery period. That is, in operation 840, the UE 810 sends scheduling allocation information to the target UE through the PSCCH during the discovery period and sends the discovery message to the target UE through the PSSCH. The transmission of the discovery message may be carried out based on, e.g., time and frequency information as per the scheduling allocation information.

In order to transmit a discovery message through the PSSCH, meanwhile, the sidelink BSR may contain additional indicators. For example, the sidelink BSR may contain information about the type of discovery. The type of discovery may include discovery of a group member or relay discovery. The duration (or period) for discovery per type may previously be defined. The eNB may determine discovery duration per type and send information about the determined discovery duration in a system information broadcast message or connection reconfiguration message to the UE. In addition, operations 830, 834 and 838 correspond, in operation, to operations 730, 734 and 738, respectively. Since operations 730, 734 and 738 have been described above with respect to FIG. 7, a description of operations 830, 834 and 838 is omitted herein.

Figure 9:
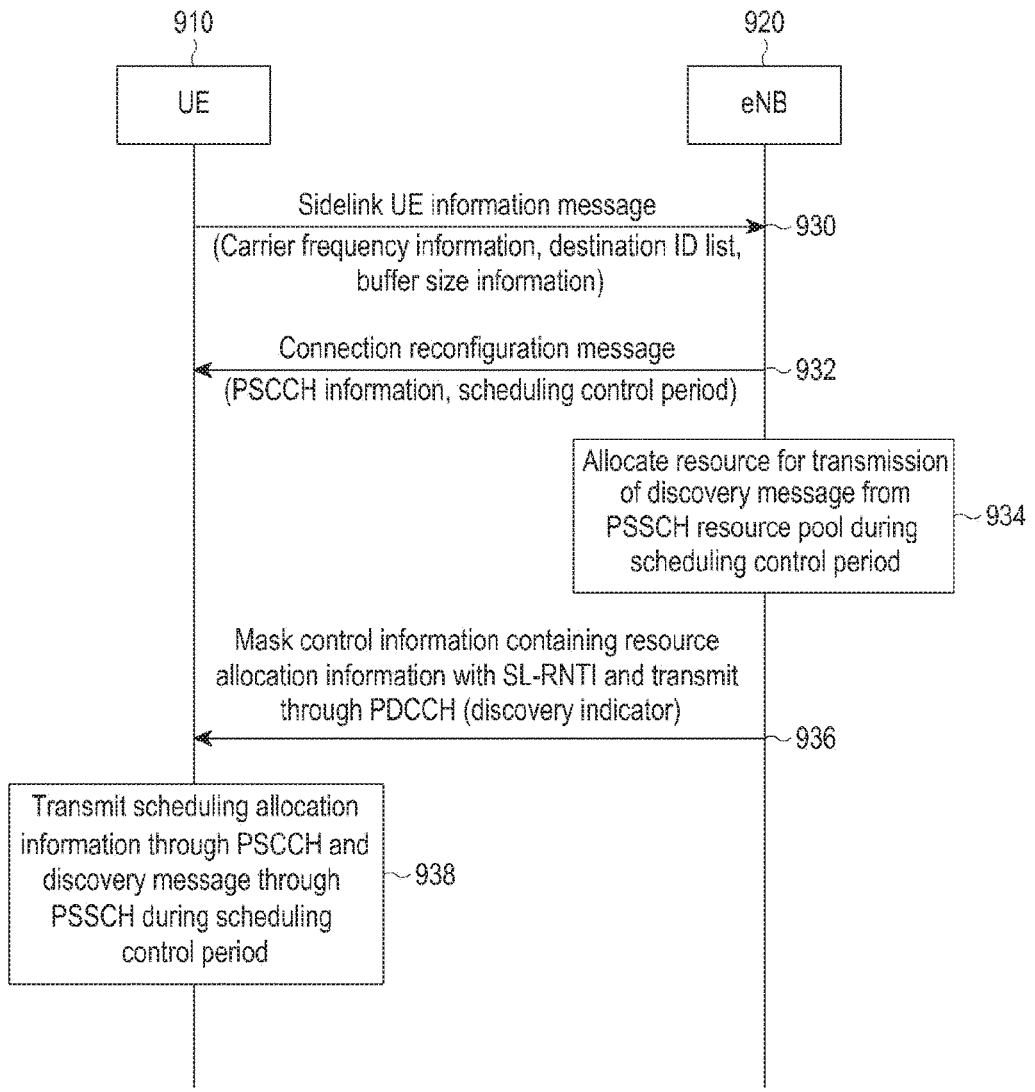
FIG. 9 is a signal flowchart illustrating a process of allocating a resource used to transmit a discovery message through a PSSCH in a wireless communication system according to an embodiment of the present disclosure.

FIG. 9 is a signal flowchart illustrating a process of allocating a resource used to transmit a discovery message through a PSSCH in a wireless communication system according to an embodiment of the present disclosure.

Referring to FIG. 9, the UE 910, in the case of transmitting a discovery message for D2D communication, sends a sidelink UE information message to the eNB 920 in operation 930. The sidelink UE information message is a message for informing the eNB 920 that the UE 910 needs D2D transmission through the PSSCH, and may include, e.g., a "CommDiscTxResourceReq" information IE containing buffer size information and a destination ID list including IDs of target devices related to D2D transmission and carrier frequency information for use by the UE 910 for D2D transmission. The buffer size information contains information about the total amount of data related to the discovery message to be transmitted by the UE 910, and the information about the total amount of data may be included in the buffer size information in byte units.

The eNB 920, upon receiving the sidelink UE information message, transmits a connection reconfiguration message to the UE 910 in operation 932. The connection reconfiguration message may be, e.g., a RRC connection reconfiguration message and may include a "CommDiscTxConfig" information IE containing information about a scheduling control period and resource information related to the PSCCH, and SL-RNTI.

The eNB 920 allocates a discovery resource for transmission of a discovery message to the UE 910 based on the buffer size information contained in the sidelink UE information message in operation 934. The discovery resource allocated to the UE 910 may be determined from a PSSCH resource pool. The eNB 920 may perform the operation of operation 934 at each scheduling control period, and the UE 910 may use the allocated discovery resource until before the scheduling control period expires.

Meanwhile, the scheduling control period may be included in, e.g., a system broadcast information message rather than the connection reconfiguration message, and may be used in other various ways; e.g., information about multiple, not one, scheduling control periods may be used.

In operation 936, the eNB 920 masks the control information containing the information about the allocated discovery resource with the SL-RNTI and sends the same to the UE 910 through the PDCCH. Here, the control information may contain information (e.g., a discovery indicator) indicating that the allocated discovery resource is to be used for transmission of a discovery message.

The UE 910, upon receiving the control information, sends a discovery message based on the allocated discovery resource. That is, in operation 938, the UE 910 sends scheduling allocation information to the target UE through the PSCCH during the scheduling control period and sends the discovery message to the target UE through the PSSCH. The transmission of the discovery message may be carried out based on, e.g., time and frequency information as per the scheduling allocation information.

Figure 10:
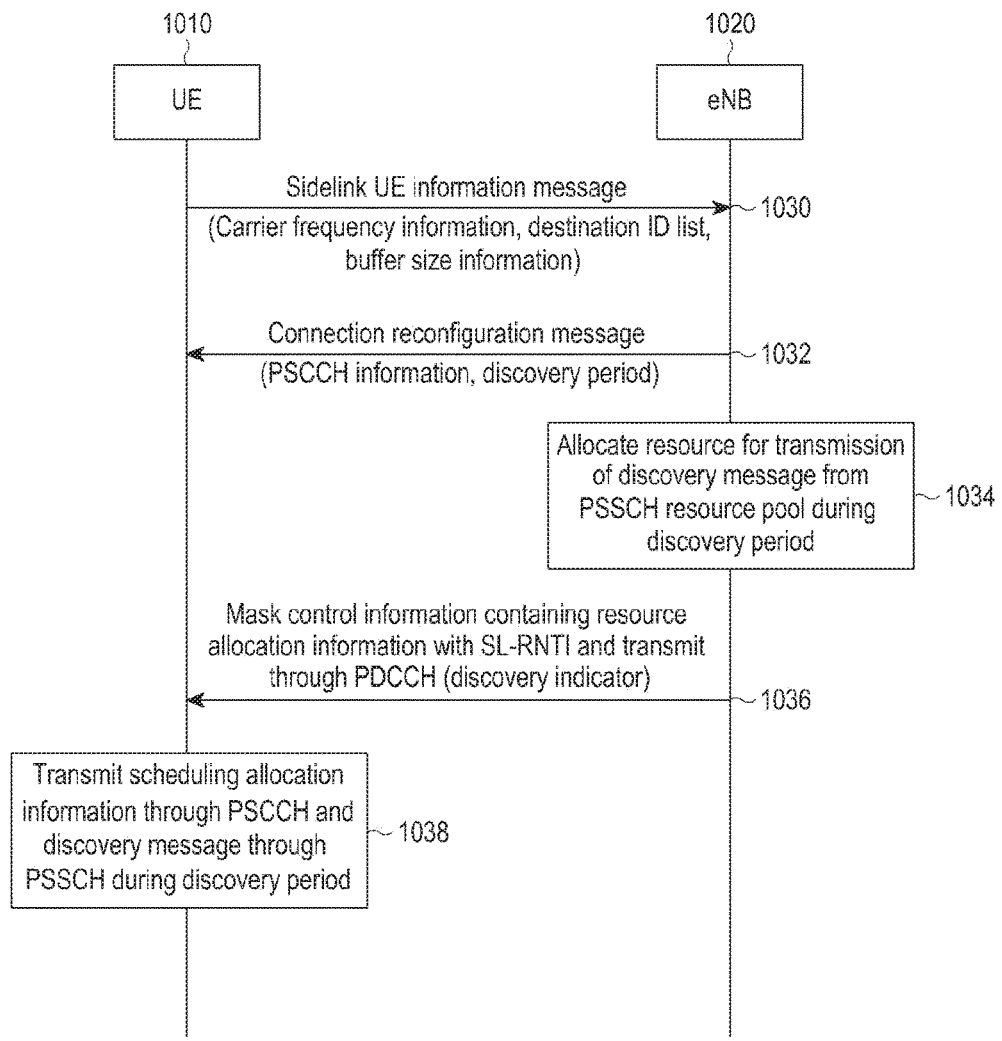
FIG. 10 is a signal flowchart illustrating a process of allocating a resource used to transmit a discovery message through a PSSCH in a wireless communication system according to an embodiment of the present disclosure.

FIG. 10 is a signal flowchart illustrating a process of allocating a resource used to transmit a discovery message through a PSSCH in a wireless communication system according to an embodiment of the present disclosure.

The process shown in FIG. 10 is the same as the process of FIG. 9 except for the following. In operation 1032 of FIG. 10, the connection reconfiguration message transmitted from the eNB 1020 to the UE 1010 contains information about a discovery period along with the SL-RNTI and PSCCH information. Here, the discovery period may be set to be larger than the scheduling control period used in FIG. 9 (e.g., as a multiple of the scheduling control period).

Accordingly, the eNB 1020, in operation 1034, allocates the resource for transmission of the discovery message from the PSSCH resource pool to the UE 1010 at each discovery period larger than the scheduling control period of FIG. 9. The UE 1010 sends a discovery message at each discovery period. That is, in operation 1038, the UE 1010 sends scheduling allocation information to the target UE through the PSCCH during the discovery period and sends the discovery message to the target UE through the PSSCH. The transmission of the discovery message may be carried out based on, e.g., time and frequency information as per the scheduling allocation information.

In order to transmit a discovery message through the PSSCH, meanwhile, the sidelink BSR may contain additional indicators. For example, the sidelink BSR may contain information about the type of discovery. The type of discovery may include discovery of a group member or relay discovery. The duration (or period) for discovery per type may previously be defined. The eNB may determine discovery duration per type and send information about the determined discovery duration in a system information broadcast message or connection reconfiguration message to the UE. In addition, operations 1030 and 1036 correspond, in operation, to operations 930 and 936, respectively. Since operations 930 and 936 have been described above with respect to FIG. 9, a description of operations 1030 and 1036 is omitted herein.

Figure 11:
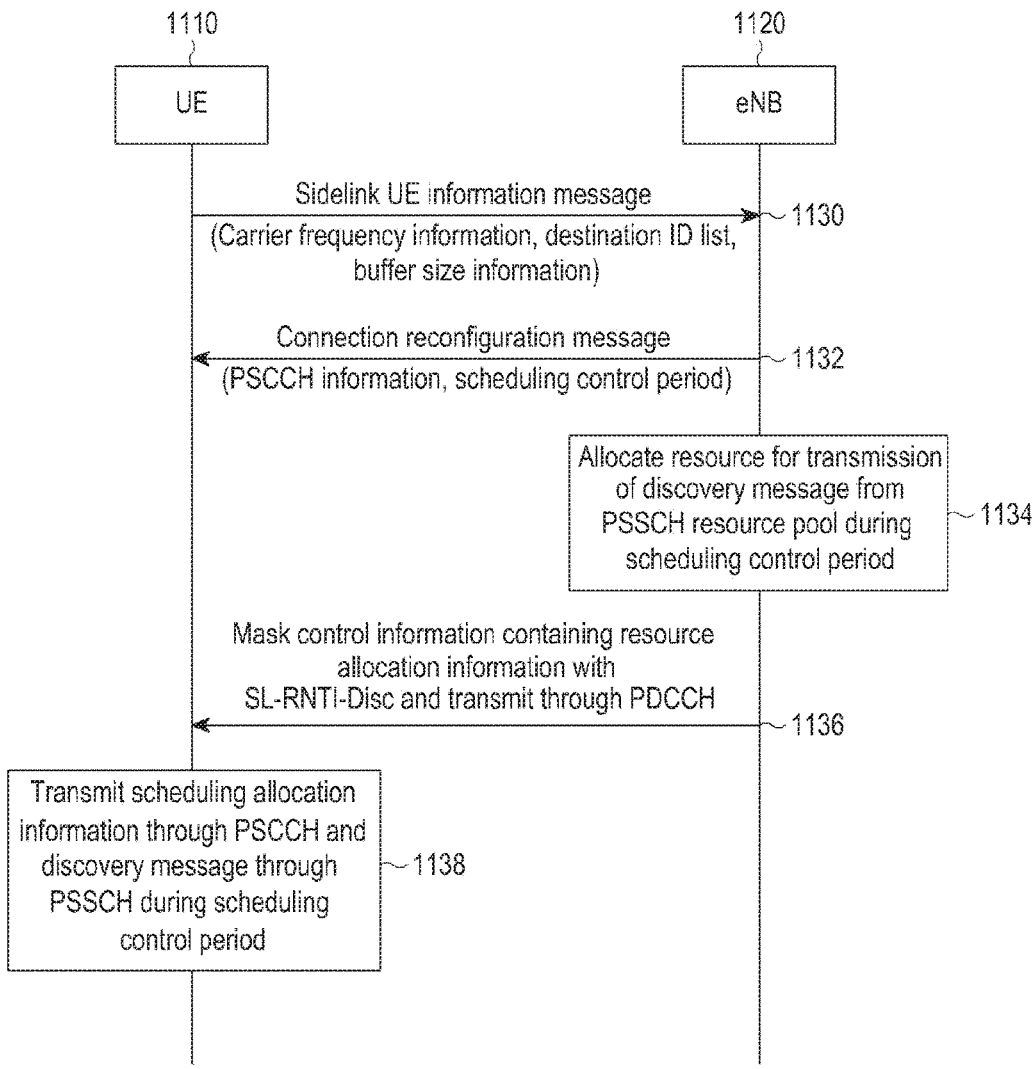
FIG. 11 is a signal flowchart illustrating a process of allocating a resource used to transmit a discovery message through a PSSCH in a wireless communication system according to an embodiment of the present disclosure.

FIG. 11 is a signal flowchart illustrating a process of allocating a resource used to transmit a discovery message through a PSSCH in a wireless communication system according to an embodiment of the present disclosure.

The process shown in FIG. 11 is the same as the process of FIG. 9 except for the following. In FIG. 11, the eNB 1120, upon receiving the sidelink UE information message from the UE 1110, transmits a connection reconfiguration message to the UE 1110 in operation 1132. The connection reconfiguration message may contain a "CommDiscTxConfig" information IE containing information about a scheduling control period, resource information related to the PSCCH, and SL-RNTI-Disc. Here, the SL-RNTI-Disc is one for indicating control information related to transmission of a discovery message and may be used for mask the information on the PDCCH. Accordingly, the eNB 1120, in operation 1136, masks the control information containing the information about the discovery resource with the SL-RNTI-Disc and sends the same through the PDCCH to the UE 1110. In this case, the control information need not include the discovery indicator. In addition, operations 1130, 1134 and 1138 correspond, in operation, to operations 930, 934 and 938, respectively. Since operations 930, 934 and 938 have been described above with respect to FIG. 9, a description of operations 1130, 1134 and 1138 is omitted herein.

Figure 12:
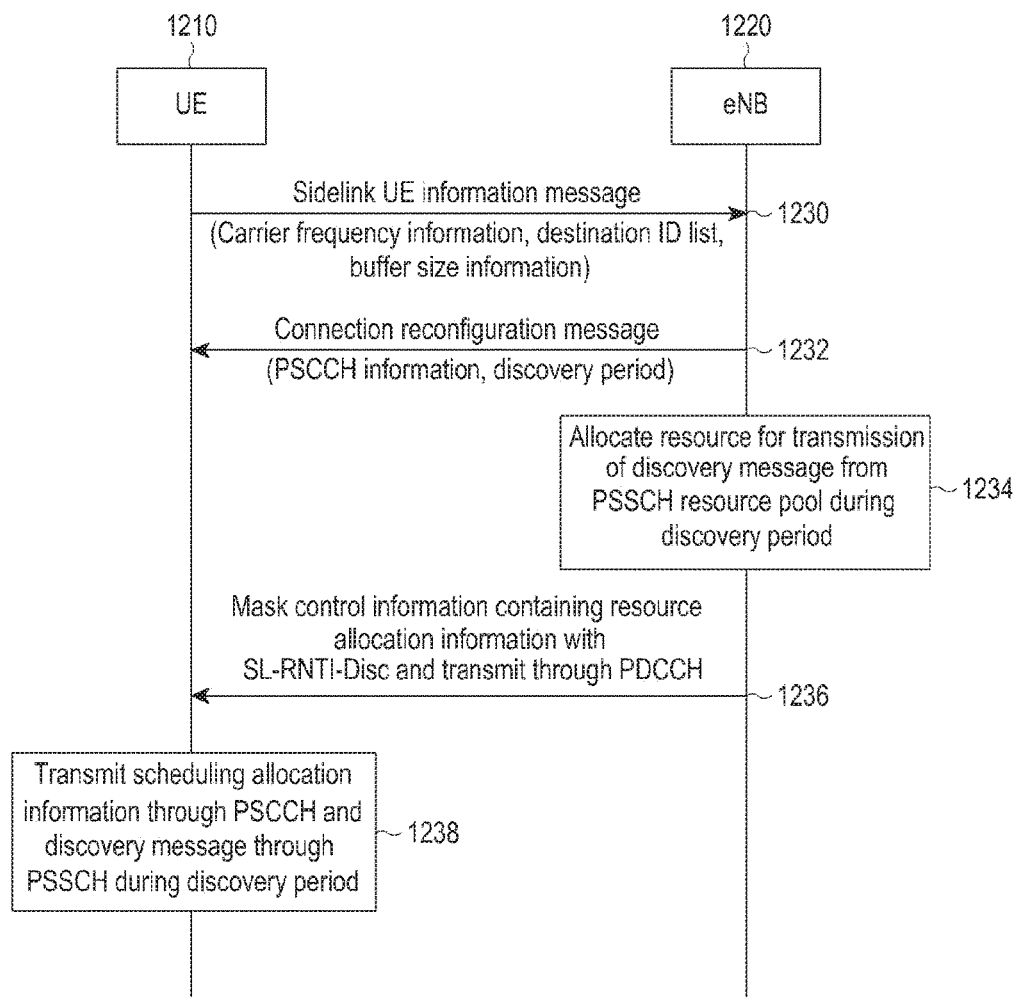
FIG. 12 is a signal flowchart illustrating a process of allocating a resource used to transmit a discovery message through a PSSCH in a wireless communication system according to an embodiment of the present disclosure.

FIG. 12 is a signal flowchart illustrating a process of allocating a resource used to transmit a discovery message through a PSSCH in a wireless communication system according to an embodiment of the present disclosure.

The process shown in FIG. 12 is the same as the process of FIG. 11 except for the following. In operation 1232 of FIG. 12, the connection reconfiguration message transmitted from the eNB 1220 to the UE 1210 contains information about a discovery period along with the SL-RNTI-Disc and PSCCH information. Here, the discovery period may be set to be larger than the scheduling control period used in FIG. 11 (e.g., as a multiple of the scheduling control period).

Accordingly, the eNB 1220, in operation 1234, allocates a discovery resource from the PSSCH resource pool to the UE 1210 at each discovery period larger than the scheduling control period of FIG. 11. The UE 1210 sends a discovery message at each discovery period. That is, in operation 1238, the UE 1210 sends scheduling allocation information to the target UE through the PSCCH during the discovery period and sends the discovery message to the target UE through the PSSCH. The transmission of the discovery message may be carried out based on, e.g., time and frequency information as per the scheduling allocation information.

In order to transmit a discovery message through the PSSCH, meanwhile, the sidelink BSR may contain additional indicators. For example, the sidelink BSR may contain information about the type of discovery. The type of discovery may include discovery of a group member or relay discovery. The duration (or period) for discovery per type may previously be defined. The eNB may determine discovery duration per type and send information about the determined discovery duration in a system information broadcast message or connection reconfiguration message to the UE. In addition, operation 1236 corresponds, in operation, to operation 1136. Since operation 1136 has been described above with respect to FIG. 11, a description of operation 1236 is omitted herein.

Figure 13:
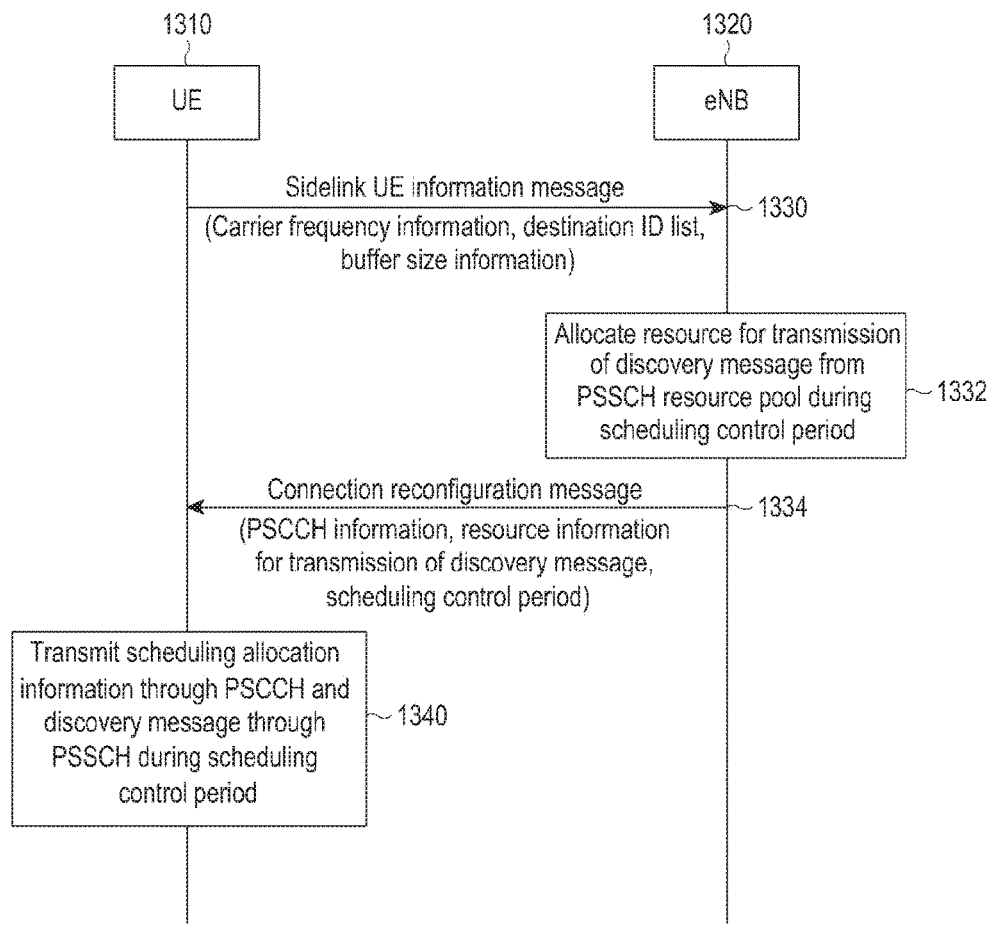
FIG. 13 is a signal flowchart illustrating a process of allocating a resource used to transmit a discovery message through a PSSCH in a wireless communication system according to an embodiment of the present disclosure.

FIG. 13 is a signal flowchart illustrating a process of allocating a resource used to transmit a discovery message through a PSSCH in a wireless communication system according to an embodiment of the present disclosure.

Referring to FIG. 13, the UE 1310, in the case of transmitting a discovery message for D2D communication, sends a sidelink UE information message to the eNB 1320 in operation 1330. The sidelink UE information message is a message for informing the eNB 1320 that the UE 1310 needs D2D transmission through the PSSCH, and may include, e.g., a "CommDiscTxResourceReq" information IE containing buffer size information and a destination ID list including IDs of target devices related to D2D transmission and carrier frequency information for use by the UE 1310 for D2D transmission. The buffer size information contains information about the total amount of data related to the discovery message to be transmitted by the UE 1310, and the information about the total amount of data may be included in the buffer size information in byte units.

In operation 1332, the eNB 1320 allocates a discovery resource for transmission of the discovery message to the UE 1310 based on the buffer size information during a predetermined scheduling control period. The discovery resource allocated to the UE 1310 may be determined from a PSSCH resource pool. The eNB 1320 may perform the operation of operation 1332 at each scheduling control period, and the UE 1310 may use the allocated discovery resource until before the scheduling control period expires.

The eNB 1320 transmits the connection reconfiguration message to the UE 1310 in operation 1334. The connection reconfiguration message may contain a "CommDiscTxConfig" information IE containing information about a scheduling control period and information about the resource for transmission of the discovery message, and PSCCH information.

The UE 1310, upon receiving the connection reconfiguration message, sends a discovery message based on the allocated discovery resource. That is, in operation 1340, the UE 1310 sends scheduling allocation information to the target UE through the PSCCH during the scheduling control period and sends the discovery message to the target UE through the PSSCH. The transmission of the discovery message may be carried out based on, e.g., time and frequency information as per the scheduling allocation information.

Figure 14:
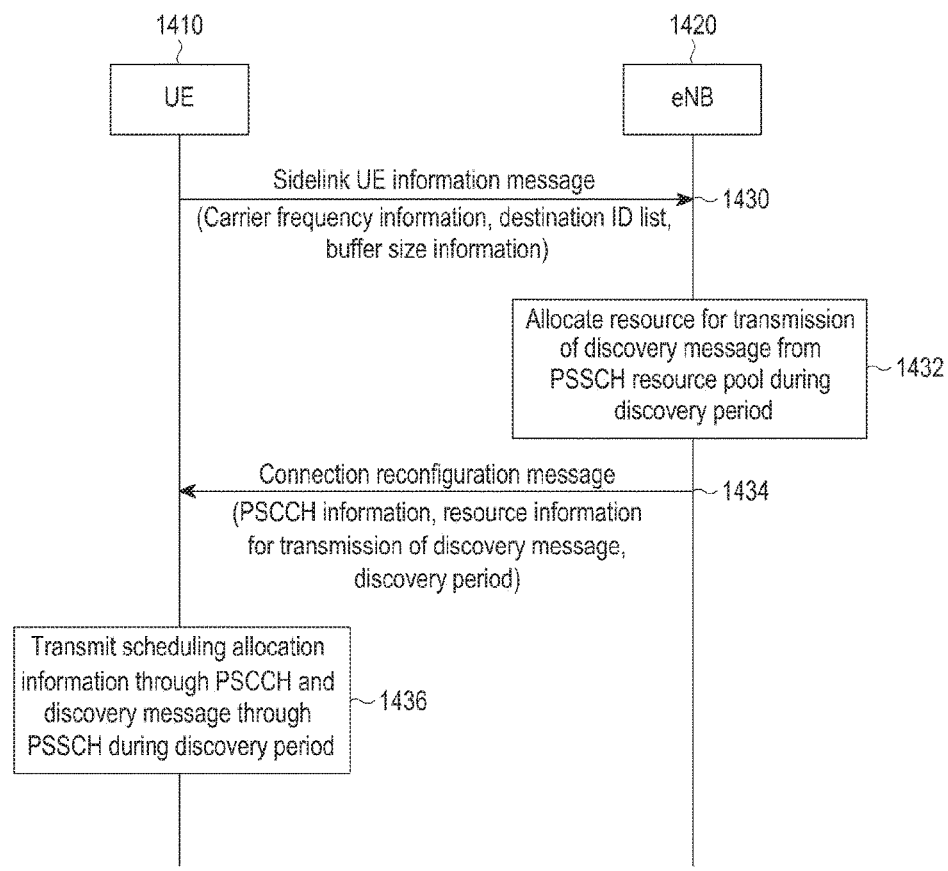
FIG. 14 is a signal flowchart illustrating a process of allocating a resource used to transmit a discovery message through a PSSCH in a wireless communication system according to an embodiment of the present disclosure.

FIG. 14 is a signal flowchart illustrating a process of allocating a resource used to transmit a discovery message through a PSSCH in a wireless communication system according to an embodiment of the present disclosure.

The process shown in FIG. 14 is the same as the process of FIG. 13 except for the following. In operation 1432 of FIG. 14, the eNB 1420 allocates a discovery resource for transmission of a discovery message to the UE 1410 based on buffer size information received in operation 1430 during a predetermined discovery period. Here, the discovery period may be set to be larger than the scheduling control period used in FIG. 13 (e.g., as a multiple of the scheduling control period).

Accordingly, the eNB 1420 allocates the discovery resource from the PSSCH resource pool to the UE 1410 at a discovery period larger than the scheduling control period of FIG. 13. The eNB 1420 may perform the operation of operation 1432 at each discovery period, and the UE 1410 may use the allocated discovery resource until before the discovery period expires.

The eNB 1420 transmits the connection reconfiguration message to the UE 1410 in operation 1434. The connection reconfiguration message may contain a "CommDiscTxConfig" information IE containing information about the discovery period and information about the discovery resource and PSCCH information.

The UE 1410, upon receiving the connection reconfiguration message, sends a discovery message based on the allocated discovery resource. That is, in operation 1436, the UE 1410 sends scheduling allocation information to the target UE through the PSCCH during the discovery period and sends the discovery message to the target UE through the PSSCH. The transmission of the discovery message may be carried out based on, e.g., time and frequency information as per the scheduling allocation information.

Meanwhile, the discovery period may be included in, e.g., a system broadcast information message rather than the connection reconfiguration message, and may be used in other various ways; e.g., information about multiple, not one, discovery periods may be used.

The sidelink UE information message transmitted in operation 1430 for transmission of the discovery message through the PSSCH may contain additional indicators. For example, the sidelink UE information message may contain information about the type of discovery. The type of discovery may include discovery of a group member or relay discovery. The duration (or period) for discovery per type may previously be defined. The eNB may determine discovery duration per type and send information about the determined discovery duration in a system information broadcast message or connection reconfiguration message to the UE.

FIGS. 15A and 15B are views illustrating a discovery PDU and a data PDU according to an embodiment of the present disclosure.

Referring first to FIG. 15A, a MAC PDU related to a discovery message (hereinafter, "discovery MAC PDU") is transferred to a PHY layer. In the PHY layer, a CRC code 1500 is added to the discovery MAC PDU, generating a PHY PDU. The CRC code 1500 added to the discovery MAC PDU is masked with a pre-defined mask.

Meanwhile, referring to FIG. 15B, a MAC PDU related to data (hereinafter, "data MAC PDU") contains a MAC header and a RLC PDU and is transferred to a PHY layer. In the PHY layer, a CRC code 1510 is added to the data MAC PDU, generating a PHY PDU. The CRC code 1510 added to the data MAC PDU is not masked with a pre-defined mask.

Hence, the receiving UE may determine whether the discovery message is transferred or data is transferred through the PSSCH based on whether the CRC code has been masked or not. The receiving UE happens to know a method for parsing the MAC PDU and which layer it should transmit the payload received in the MAC PDU to.

Meanwhile, as illustrated in FIGS. 15A and 15B, the discovery message may be a vehicle-to-vehicle (V2V) message or periodic message (packet/data).

FIGS. 16A and 16B are views illustrating a discovery PDU and a data PDU according to an embodiment of the present disclosure.

Referring to FIG. 16A, a discovery MAC PDU contains a MAC PDU format version number field 1600. The MAC PDU format version number field 1600 contains a preset value indicating that the MAC PDU is one related to a discovery message.

Referring to FIG. 16B, the MAC header of the data MAC PDU contains a MAC header format version number field 1610. The MAC header format version number field 1610 contains a preset value indicating that the MAC PDU is one related to data.

The MAC PDU format version number field 1600 and the MAC header format version number field 1610 contain different values. Accordingly, the receiving UE may determine whether a discovery message is transferred or data is transferred through the PSSCH based on at least one of the values contained in the MAC PDU format version number field 1600 and the MAC header format version number field 1610. The receiving UE happens to know a method for parsing the MAC PDU and which layer it should transmit the payload received in the MAC PDU to.

Meanwhile, in FIGS. 16A and 16B, the discovery message may be a V2V message or periodic message (packet/data).

Figures 17A, 17B:
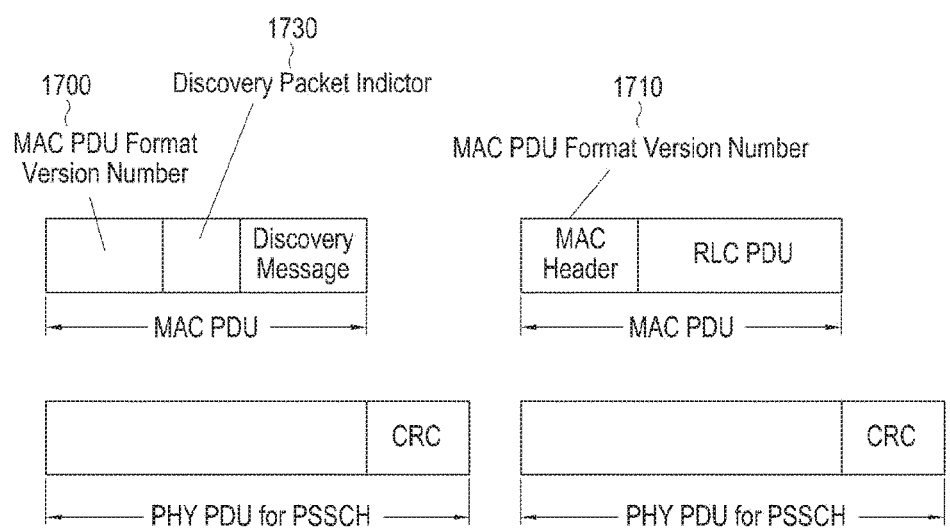
FIGS. 17A and 17B are views illustrating a discovery PDU and a data PDU according to an embodiment of the present disclosure.

FIGS. 17A and 17B are views illustrating a discovery PDU and a data PDU according to an embodiment of the present disclosure.

Referring to FIG. 17A, a discovery MAC PDU contains a MAC PDU format version number field 1700. The MAC PDU format version number field 1700 contains a preset value indicating that the MAC PDU is one related to a discovery message. The discovery MAC PDU further includes a discovery packet indicator 1730 indicating that the MAC PDU is one related to a discovery message.

Referring to FIG. 17B, the MAC header of the data MAC PDU contains a MAC header format version number field 1710. The MAC header format version number field 1710 contains a preset value indicating that the MAC PDU is one related to data. The MAC header of the data MAC PDU contains no discovery packet indicator.

Hence, the receiving UE may determine whether the discovery message is transferred or data is transferred through the PSSCH based on whether the MAC PDU contains a discovery packet indicator or not. The receiving UE happens to know a method for parsing the MAC PDU and which layer it should transmit the payload received in the MAC PDU to.

Meanwhile, in FIGS. 17A and 17B, the discovery message may be a V2V message or periodic message (packet/data).

The LCID field of the LCID subheader in the MAC header may be reserved and may contain a value indicating that it is one related to a discovery message. Meanwhile, the discovery message may be a V2V message or periodic message (packet/data).

Figure 18:
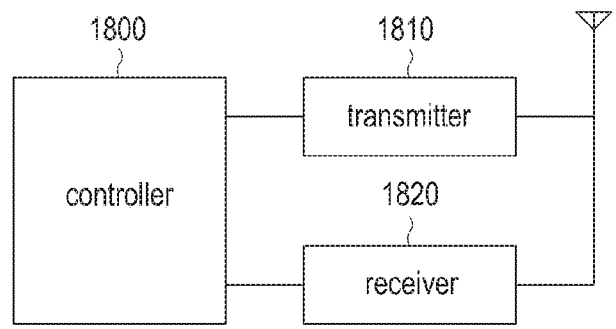
FIG. 18 is a block diagram illustrating a configuration of a UE according to an embodiment of the present disclosure.

FIG. 18 is a block diagram illustrating a configuration of a UE according to an embodiment of the present disclosure.

Referring to FIG. 18, the UE includes a controller 1800 (i.e. at least one processor), a transmitter 1810, and a receiver 1820. The controller 1800 controls the transmitter 1810 and the receiver 1820 and performs the operation of the UE related to the methods set forth above according to an embodiment of the present disclosure. The transmitter 1810 and the receiver 1820 are components for performing communication with the eNB and the target UE and perform operations related to transmission and reception of data and discovery messages under the control of the controller 1800. Meanwhile, a component for performing communication with the eNB and a component for performing communication with the target UE may be separately included in the UE. Further, although not shown in FIG. 18, the UE may further include a memory storing various pieces of information related to the operation of the UE.

Figure 19:
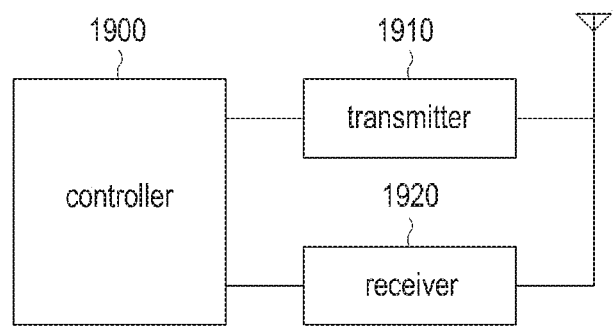
FIG. 19 is a block diagram illustrating a configuration of an evolved node B (eNB) according to an embodiment of the present disclosure.

FIG. 19 is a block diagram illustrating a configuration of an eNB according to an embodiment of the present disclosure.

Referring to FIG. 19, the eNB includes a controller 1900 (i.e. at least one processor), a transmitter 1910, and a receiver 1920. The controller 1900 controls the transmitter 1910 and the receiver 1920 and performs the operation of the eNB related to the methods set forth above according to an embodiment of the present disclosure. The transmitter 1910 and the receiver 1920 are components for performing communication with the UE and perform operations related to transmission and reception of data under the control of the controller 1900. Meanwhile, although not shown in FIG. 19, the eNB may further include a memory storing various pieces of information related to the operation of the eNB.

Particular aspects of the present disclosure may be implemented in computer-readable codes on a computer-readable recording medium. The computer readable recording medium is a data storage device that may store data readable by a computer system. Examples of the computer readable recording medium may include read only memories (ROMs), random access memories (RAMs), compact disc-ROMs (CD-ROMs), magnetic tapes, floppy disks, optical data storage devices, and carrier waves (such as data transmission over the Internet). The computer readable recording medium may be distributed by computer systems over a network, and accordingly, the computer readable codes may be stored and executed in a distributed manner. Functional programs, codes, and code segments to attain the present disclosure may be readily interpreted by skilled programmers in the art to which the present disclosure pertains.

The apparatuses and methods according to embodiments of the present disclosure may be implemented in hardware, software, or a combination of hardware and software. Such software may be stored in a volatile or non-volatile storage device such as a ROM or other storage devices, a memory, such as a RAM, a memory chip, a device or an integrated circuit, or a storage medium, such as, e.g., a CD, a DVD, a magnetic disk, or a magnetic tape, which allows for optical or magnetic recording while simultaneously read out by a machine (e.g., a computer). The methods according to embodiments of the present disclosure may be implemented by a computer or a portable terminal including a controller (i.e. at least one processor) and a memory, and the memory may be a machine-readable storage medium that may properly retain program(s) containing instructions for implementing the embodiments of the present disclosure.

Accordingly, the present disclosure encompasses a program containing codes for implementing the device or method set forth in the claims of this disclosure and a machine (e.g., computer)-readable storage medium storing the program. The program may be electronically transferred via any media such as communication signals transmitted through a wired or wireless connection and the present disclosure properly includes the equivalents thereof.

The apparatuses according to various embodiments of the present disclosure may receive the program from a program providing device wiredly or wirelessly connected thereto and store the same. The program providing apparatus may include a memory for storing a program including instructions enabling a program processing apparatus to perform a method according to an embodiment of the present disclosure and data necessary for a method according to an embodiment of the present disclosure, a communication unit for performing wired or wireless communication with a graphic processing apparatus, and a controller (i.e. at least one processor) transmitting the program to the graphic processing apparatus automatically or as requested by the graphic processing apparatus.

While the present disclosure has been shown and described with reference to various embodiments thereof, it will be understood by those skilled in the art that various changes in form and details may be made therein without departing from the spirit and scope of the present disclosure as defined by the appended claims and their equivalents.

The invention claimed is:

1. A method for transmitting a message by a first user equipment (UE) in a wireless communication system, the method comprising:
   transmitting, to a base station, a UE information message comprising a buffer size and frequency information for use in transmitting a discovery message;
   receiving, from the base station, a connection reconfiguration message comprising information about at least one period for transmitting the discovery message through a data channel based on the buffer size;
   transmitting, to the base station, a request message comprising information indicating that the discovery message is to be transmitted through the data channel and information about a data amount related to the discovery message;
   receiving, from the base station, a control message comprising information about a resource allocated to transmit the discovery message and information indicating that the control message comprises information for transmitting the discovery message; and
   transmitting the discovery message to a second UE through the data channel based on the control message.

2. The method of claim 1, wherein the request message comprises: a buffer state report (BSR) comprising information indicating that the discovery message is to be transmitted through the data channel, the information about the data amount related to the discovery message, and an indicator indicating that a resource for transmitting the discovery message is required.

3. The method of claim 1, wherein the
   UE information message further comprises target UE list information.

4. The method of claim 1, wherein the discovery message is identified by the second UE based on whether a cyclic redundancy check (CRC) code, the CRC code being added to a medium access control (MAC) protocol data unit (PDU) related to the discovery message, is masked with a certain value.

5. The method of claim 1, wherein one of a medium access control (MAC) protocol data unit (PDU) (MAC PDU) format version number field comprised in a MAC header of a MAC PDU related to the discovery message and a logical channel identifier (LCID) field of an LCID subheader included in the MAC header comprises a value or an indicator indicating the discovery message.

6. A first user equipment (UE) in a wireless communication system, the UE comprising:
   a transmitter configured to transmit, to a base station, a UE information message comprising a buffer size and frequency information for use in transmitting a discovery message;
   a receiver configured to receive, from the base station, a connection reconfiguration message comprising information about at least one period for transmitting the discovery message through a data channel based on the buffer size; and
   a processor configured to:
      control the transmitter to transmit, to the base station, a request message including information indicating that the discovery message is to be transmitted through the data channel and information about a data amount related to the discovery message,
      control the receiver to receive, from the base station, a control message comprises information about a resource allocated to transmit the discovery message and information indicating that the control message comprising information for transmitting the discovery message, and
      control the transmitter to transmit the discovery message to a second UE through the data channel based on the control message.

7. The first UE of claim 6, wherein the request message comprises a buffer state report (BSR) comprising:
   information indicating that the discovery message is to be transmitted through the data channel, the information about the data amount related to the discovery message, and an indicator indicating that a resource for transmitting the discovery message is required.

8. The first UE of claim 6, wherein the
   UE information message further comprises target UE list information.

9. The first UE of claim 6, wherein the discovery message is identified by the second UE based on whether a cyclic redundancy check (CRC) code, the CRC code being added to a medium access control (MAC) protocol data unit (PDU) related to the discovery message, is masked with a certain value.

10. The first UE of claim 6, wherein one of a medium access control (MAC) protocol data unit (PDU) (MAC PDU) format version number field comprised in a MAC header of a MAC PDU related to the discovery message and a logical channel identifier (LCID) field of an LCID subheader included in the MAC header comprises a value or an indicator indicating the discovery message.

11. A method for allocating a resource for transmitting a message by a base station in a wireless communication system, the method comprising:
   receiving, from a first user equipment (UE), a UE information message comprising a buffer size and frequency information for use in transmitting a discovery message;
   transmitting, to the first UE, a connection reconfiguration message comprising information about at least one period for transmitting the discovery message through a data channel based on the buffer size;
   receiving, from the first UE, a request message comprising information indicating that the discovery message is to be transmitted through the data channel and information about a data amount related to the discovery message;

allocating a resource to transmit the discovery message to the first UE based on a resource pool related to the data channel; and transmitting, to the first UE, a control message comprising information about the allocated resource and information indicating that the control message comprises information for transmitting the discovery message.

12. The method of claim 11, wherein the request message comprises a buffer state report (BSR) comprising information indicating that the discovery message is to be transmitted through the data channel, the information about the data amount related to the discovery message, and an indicator indicating that a resource for transmitting the discovery message is required.

13. The method of claim 11, wherein the UE information message further comprises target UE list information.

14. The method of claim 11, wherein the discovery message is identified by the second UE based on whether a cyclic redundancy check (CRC) code, the CRC code being added to a medium access control (MAC) protocol data unit (PDU) related to the discovery message, is masked with a certain value.

15. The method of claim 11, wherein one of a medium access control (MAC) protocol data unit (PDU) (MAC PDU) format version number field comprised in a MAC header of a MAC PDU related to the discovery message and a logical channel identifier (LCID) field of an LCID sub-header included in the MAC header comprises a value or an indicator indicating the discovery message.

16. A base station in a wireless communication system, the base station comprising:
   a receiver configured to receive, from a first user equipment (UE), a UE information message comprising a buffer size and frequency information for use in transmitting a discovery message;
   a transmitter configured to transmit, from the base station, a connection reconfiguration message comprising information about at least one period for transmitting the discovery message through a data channel based on the buffer size; and
   a processor configured to:
      control the receiver to receive, from the base station, a request message comprising information indicating that the discovery message is to be transmitted to a second UE through the data channel and information about a data amount related to the discovery message,
      allocate a resource to transmit the discovery message to the first UE based on a resource pool related to the data channel, and
      control the transmitter to transmit, to the first UE, a control message comprising information about the allocated resource and information indicating that the control message comprises information for transmitting the discovery message.

17. The base station of claim 16, wherein the request message comprises:
   a buffer state report (BSR) comprising information indicating that the discovery message is to be transmitted through the data channel, the information about the data amount related to the discovery message, and
   an indicator indicating that a resource for transmitting the discovery message is required.

18. The base station of claim 16, wherein the UE information message further comprises target UE list information.

19. The base station of claim 16, wherein the discovery message is identified by the second UE based on whether a cyclic redundancy check (CRC) code, the CRC code being added to a medium access control (MAC) protocol data unit (PDU) related to the discovery message, is masked with a certain value.

20. The base station of claim 16, wherein one of a medium access control (MAC) protocol data unit (PDU) (MAC PDU) format version number field comprised in a MAC header of a MAC PDU related to the discovery message and a logical channel identifier (LCID) field of an LCID sub-header included in the MAC header comprises a value or an indicator indicating the discovery message.

* * * * *